(12) United States Patent
Sauer et al.

(10) Patent No.: US 9,493,687 B2
(45) Date of Patent: Nov. 15, 2016

(54) HEAT-CURING REACTIVE SYSTEMS

(71) Applicant: Henkel AG & Co. KGaA, Duesseldorf (DE)

(72) Inventors: Ralf Sauer, St. Leon-Rot (DE); Peter Born, Sandhausen (DE); Mathias Muller, Weisenheim a.S. (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 262 days.

(21) Appl. No.: 14/568,962

(22) Filed: Dec. 12, 2014

(65) Prior Publication Data

US 2015/0096681 A1 Apr. 9, 2015

Related U.S. Application Data

(63) Continuation of application No. PCT/EP2013/062127, filed on Jun. 12, 2013.

(30) Foreign Application Priority Data

Jun. 13, 2012 (DE) ........................ 10 2012 209 923

(51) Int. Cl.
| | |
|---|---|
| C08F 283/00 | (2006.01) |
| C09J 147/00 | (2006.01) |
| C08K 5/00 | (2006.01) |
| C08K 5/103 | (2006.01) |
| C09J 109/00 | (2006.01) |
| B05D 1/02 | (2006.01) |
| B05D 3/02 | (2006.01) |
| C09D 5/00 | (2006.01) |
| C09D 147/00 | (2006.01) |
| C09J 5/00 | (2006.01) |
| C09J 9/00 | (2006.01) |
| C08G 63/91 | (2006.01) |
| C08L 9/00 | (2006.01) |
| C08L 9/06 | (2006.01) |
| C08L 13/00 | (2006.01) |

(52) U.S. Cl.
CPC ............... *C09J 147/00* (2013.01); *B05D 1/02* (2013.01); *B05D 3/0254* (2013.01); *C08K 5/0025* (2013.01); *C08K 5/103* (2013.01); *C09D 5/00* (2013.01); *C09D 147/00* (2013.01); *C09J 5/00* (2013.01); *C09J 9/00* (2013.01); *C09J 109/00* (2013.01); *C08L 9/00* (2013.01); *C08L 9/06* (2013.01); *C08L 13/00* (2013.01)

(58) Field of Classification Search
CPC ................................ B05D 1/02; C09J 147/00
USPC ........................................................ 525/418
See application file for complete search history.

(56) References Cited

U.S. PATENT DOCUMENTS

| | | | |
|---|---|---|---|
| 6,800,682 B1 | 10/2004 | Windhoevel et al. | |
| 8,137,500 B2 | 3/2012 | Sauer et al. | |
| 8,436,105 B2 | 5/2013 | Kohlstrung et al. | |
| 2004/0052951 A1* | 3/2004 | Sauer ...................... | C08K 5/33 427/385.5 |

FOREIGN PATENT DOCUMENTS

| | | |
|---|---|---|
| CA | 2205953 A1 | 5/1996 |
| CA | 2215675 A1 | 9/1996 |
| EP | 0363302 A2 | 4/1990 |
| EP | 1544243 A1 | 6/2005 |
| WO | 9616136 A1 | 5/1996 |
| WO | 9628505 A1 | 9/1996 |
| WO | 9700912 A1 | 1/1997 |
| WO | 2006076958 A1 | 7/2006 |
| WO | 2008134217 A1 | 11/2008 |
| WO | 2010142563 A1 | 12/2010 |

OTHER PUBLICATIONS

International Search Report for International Application No. PCT/EP2013/062127 dated Sep. 12, 2013.

\* cited by examiner

*Primary Examiner* — Terressa Boykin

(74) *Attorney, Agent, or Firm* — Mary K. Cameron

(57) ABSTRACT

The present application provides heat-curing preparations containing (a) a triglyceride fraction, the fatty acid distribution of which has a proportion of at least 5 wt. %, in particular at least 60 wt. %, of one or more Ω-3 fatty acids and/or one or more Ω-6 fatty acids, (b) at least one vulcanizing agent selected from the group consisting of (b1) sulfur, (b2) peroxidic vulcanizing agents, (b3) quinones and/or quinone dioximes and/or (b4) dinitrosobenzenes, and (c) at least one inorganic filler.

14 Claims, No Drawings

HEAT-CURING REACTIVE SYSTEMS

The present application relates to heat-curing preparations based on a triglyceride fraction containing Ω-3 fatty acids and/or Ω-6 fatty acids, to a method for producing said preparations and to the use of said preparations as an acoustically damping adhesive, sealant or coating composition.

Very thin-walled metal sheets are commonly used in the production of motor vehicles, machines and devices in order to reduce the weight. Mechanically moving parts or running motors inevitably cause these thin-walled metal sheets to vibrate, the frequency of said vibrations often being within the acoustic range of the human ear. These vibrations are transmitted across the entire vehicle, machine or device in the form of solid-borne sound, which can be emitted into the air at remote points as disturbing noise. Therefore, in order to reduce the sound emission and to dampen the solid-borne sound, the thin-walled metal sheets that are used, especially in automotive construction and in the manufacture of domestic appliances, are provided with noise-reducing coatings known as resonance-deadening coatings.

According to the conventional procedure, mixtures of fillers having a high specific weight and bitumen are extruded into films, from which individually shaped parts are then punched or cut. These shaped parts are then adhesively bonded or magnetically fixed to the sheet metal parts in question, wherein they are optionally also adapted to the shape of the metal sheet by heating. Although some of these bitumen films are very brittle and occasionally, at low temperature in particular, tend to flake away from the metal sheet, they are still in common usage because of their low material cost. The frequently proposed additions of elastomers likewise bring about only a slight improvement in this problem, which for many applications is inadequate. Furthermore, applying the preshaped bitumen parts to elaborately shaped or poorly accessible sheet metal parts of machines or motor vehicles, for example the inner surfaces of the cavities in vehicle doors, is difficult and in some cases completely impossible. As a further disadvantage, it is often the case that a plurality of punched parts are needed for a single motor vehicle or device, requiring an expensive storage provision in the vehicle manufacturing sector. A further disadvantage of the bitumen shaped parts is their high weight. There is also the risk of magnetically fixed shaped parts slipping and then no longer being positioned in the region of the sheet metal part that requires damping.

Attempts have thus been made to develop other polymer systems as an alternative, which do not have the disadvantages of bitumen films. Thus, for example, fillers containing aqueous polymer dispersions of polyvinyl acetate or ethylene-vinyl acetate copolymers, which can be sprayed onto the sheet metal parts in the necessary coating thickness, have been developed. However, these systems are disadvantageous, in particular for industrial use with high production numbers, as with greater coating thicknesses the water cannot be removed quickly enough from the sprayed-on layer. A further disadvantage of these conventional methods of sound damping lies in the fact that these materials serve only the single purpose of sound damping.

In the endeavor to reduce the complexity of vehicles, machines and devices and hence to lower manufacturing costs, there is a desire in the motor vehicle industry in particular to provide sound-damping materials which can be selectively applied automatically with the aid of robots, where possible in the body shell stage of vehicle manufacture or in the painting line.

Thus, for example WO-A1-96/16136 and WO-A1-2006/076958 propose one-component, heat-curing, reactive compositions based on liquid rubbers having reactive olefinic double bonds and optionally added rubbers and sulfur-based vulcanizing systems. In the vulcanized state these compositions have high maxima for the acoustic loss factor in the working temperature range of between approximately +10° C. and +40° C.

Although these preparations meet the technical requirements to a high degree, the need also to formulate such adhesives and sealants on the basis of natural and/or sustainable raw materials has been growing steadily recently.

Correspondingly, the problem of the present invention was to develop heat-curable preparations which in terms of their ease of application and their mechanical properties are comparable to compositions based on liquid rubbers but which contain a higher proportion of natural and/or sustainable raw materials.

Surprisingly it has now been found that heat-curable preparations based on triglyceride fractions with a content of Ω-3 fatty acids and/or Ω-6 fatty acids are characterized by good ease of application and excellent mechanical properties in the cured state. Heat curing produces rubber-like, tack-free elastomer structures from the systems according to the invention, the strength of which (cohesive strength, measured as the tensile strength of the crosslinked film in accordance with DIN 53504), is variably adjustable in the range from 0.2 MPa to 6 MPa. In contrast to traditional systems based on synthetic rubber, the use of the triglyceride fractions according to the invention leads moreover to wider spray fan patterns at the same and in some cases even at lower processing pressures.

The present invention thus firstly provides heat-curing preparations containing
 (a) a triglyceride fraction, the fatty acid distribution of which has a proportion of at least 5 wt. %, in particular at least 60 wt %, of one or more Ω-3 fatty acids and/or one or more Ω-6 fatty acids,
 (b) at least one vulcanizing agent selected from the group consisting of
  (b1) sulfur,
  (b2) peroxidic vulcanizing agents,
  (b3) quinones and/or quinone dioximes and/or
  (b4) dinitrosobenzenes,
 (c) at least one inorganic filler and
 (d) at least one synthetic polymer having at least one C=C double bond and/or at least one C≡C triple bond.

As the first component according to the invention the heat-curable preparations according to the invention contain at least one triglyceride fraction, the fatty acid distribution of which has a proportion of at least 5 wt. %, in particular at least 10 wt. %, most particularly preferably 60 wt. %, of one or more Ω-3 fatty acids and/or one or more Ω-6 fatty acids.

A "triglyceride fraction" is understood according to the invention to be the sum of all triglycerides contained in the preparation, namely the triple ester of glycerol with three fatty acid molecules. As far as determining the triglyceride fraction is concerned, the raw material from which the triglycerides derive is unimportant.

According to the invention the fatty acid distribution of a triglyceride fraction indicates the proportions by mass of the various fatty acids, relative to the total mass of fatty acids in the triglyceride fraction; the various proportions are conventionally determined by gas chromatography following release of the fatty acids as methyl ester. Accordingly, the mass of glycerol does not come into this equation.

Preferred Ω-3 fatty acids according to the invention are:
hexadecatrienoic acid (16:3; (ω-3)),
alpha-linolenic acid (18:3 (ω-3)),
stearidonic acid (18:4; (ω-3)),
eicosatrienoic acid (20:3; (ω-3)),
eicosatetraenoic acid (20:4; (ω-3)),
eicosapentaenoic acid (20:5; (ω-3)),
heneicosapentaenoic acid (21:5; (ω-3)),
docosapentaenoic acid (22:5; (ω-3)),
docosahexaenoic acid (22:6; (ω-3)),
tetracosapentaenoic acid (24:5; (ω-3)), and
tetracosahexaenoic acid (24:6; (ω-3)).

Particularly preferred Ω-3 fatty acids according to the invention are:
alpha-linolenic acid (18:3 (ω-3)), and
eicosapentaenoic acid (20:5; (ω-3)).

According to the invention alpha-linolenic acid (18:3 (ω-3)) is a most particularly preferred Ω-3 fatty acid.

Preferred Ω-6 fatty acids according to the invention are:
linoleic acid (18:2; (ω-6)),
gamma-linolenic acid (18:3; (ω-6)),
calendic acid (18:3; (ω-6)),
eicosadienoic acid (20:2; (ω-6)),
dihomo-gamma-linolenic acid (20:3; (ω-6)),
arachidonic acid (20:4; (ω-6)),
docosadienoic acid (22:2; (ω-6)),
docosatetraenoic acid (22:4; (ω-6)),
docosapentaenoic acid (22:5; (ω-6)),
tetracosatetraenoic acid (24:4; (ω-6)), and
tetracosapentaenoic acid (24:5; (ω-6)).

Particularly preferred Ω-6 fatty acids according to the invention are:
linoleic acid (18:2; (ω-6)),
gamma-linolenic acid (18:3; (ω-6)), and
arachidonic acid (20:4; (ω-6)).

According to the invention linoleic acid (18:2 (ω-6)) is a most particularly preferred Ω-6 fatty acid.

Particularly good mechanical properties were obtained if the triglyceride fraction has a fatty acid distribution with a proportion of at least 4 wt. %, in particular at least 15 wt. %, of one or more Ω-3 fatty acids.

It has proved advantageous according to the invention for at least 40 wt. %, in particular at least 60 wt. %, most particularly preferably 100 wt. % of the triglyceride fraction to be liquid at 25° C., i.e. to be in the form of an oil.

It has moreover proved advantageous for the triglyceride fraction having the proportions according to the invention of Ω-3 fatty acids and/or Ω-6 fatty acids to derive from a natural source, for example corresponding vegetable and/or animal oils. Although vegetable oils are particularly preferred according to the invention, a use of animal oils, such as fish oil or fish liver oil for example, is also included according to the invention.

Triglyceride fractions according to the invention are contained for example in sunflower oil, rapeseed oil, soybean oil, tall oil, camelina oil, tung oil, linseed oil and/or hemp oil. Rapeseed oil, soybean oil, tall oil, camelina oil, tung oil, linseed oil and/or hemp oil are preferred according to the invention; tall oil, camelina oil, tung oil, linseed oil and/or hemp oil are particularly preferred according to the invention; tung oil, linseed oil and hemp oil are preferred in particular according to the invention. The use of linseed oil is most particularly preferred. The use of a combination of two, three or more suitable oils, such as for example
sunflower oil and rapeseed oil,
sunflower oil and soybean oil,
sunflower oil and tall oil,
sunflower oil and camelina oil,
sunflower oil and tung oil,
sunflower oil and linseed oil,
sunflower oil and hemp oil,
rapeseed oil and soybean oil,
rapeseed oil and tall oil,
rapeseed oil and camelina oil,
rapeseed oil and tung oil,
rapeseed oil and linseed oil,
rapeseed oil and hemp oil,
soybean oil and tall oil,
soybean oil and camelina oil,
soybean oil and tung oil,
soybean oil and linseed oil,
soybean oil and hemp oil,
tall oil and camelina oil,
tall oil and tung oil,
tall oil and linseed oil,
tall oil and hemp oil,
camelina oil and tung oil,
camelina oil and linseed oil,
camelina oil and hemp oil,
tung oil and linseed oil,
tung oil and hemp oil, or
linseed oil and hemp oil
is also preferred according to the invention.

The triglyceride fraction (a) or the oil containing the triglyceride fraction is contained in the heat-curable preparations according to the invention preferably in an amount from 5 to 50 wt. %, in particular from 10 to 40 wt. %, relative to the total preparation.

As the second constituent that is essential to the invention the heat-curable preparations according to the invention contain at least one specially selected vulcanizing system selected from the group consisting of:
(b1) sulfur,
(b2) peroxidic vulcanizing systems,
(b3) quinones and/or quinone dioximes and/or
(b4) dinitrosobenzenes.

In a first preferred embodiment synthetic or natural sulfur is used as the vulcanizing agent. Powdered sulfur is preferably used according to the invention; however, in order to avoid dust contamination in production it can also be preferable to use sulfur mixed with a dust-binding agent, for example mixed with mineral oil, paraffin oil or silicon dioxide. The content of dust-binding oils can be chosen such that a sulfur-containing paste is used as the raw material. Sulfur is preferably used in the $S_8$ configuration.

The active substance content of sulfur in the preparations according to the invention can vary within broad limits; it can be up to 20 wt. %, preferably up to approximately 15 wt. %, in particular up to 10 wt. %, relative in each case to the total heat-curable preparation; the lower limit should preferably not be below 0.5 wt. %. The content of sulfur is dependent on the reactivity of the liquid rubbers used and optionally on the use of polymerization additives. Moreover, the loss factor maximum and the usable temperature range of a sufficiently high loss factor can be influenced by the sulfur content.

In a second preferred embodiment, radical vulcanizing agents based on organic or inorganic peroxides are used. Examples of preferred peroxides according to the invention are diacetyl peroxide, di-tert-butyl peroxide, dicumyl peroxide and dibenzoyl peroxide. The peroxides are contained as vulcanizing agents in the preparations according to the invention in amounts from 0.2 wt. % to 3 wt. %.

In a third preferred embodiment quinones and/or quinone dioximes are used as vulcanizing agents. p-Benzoquinone dioxime is a particularly preferred representative of this group. The quinones and/or quinone dioximes are preferably used in the preparations according to the invention in concentrations from 0.2 wt. % to 5 wt. %. These quinone-based vulcanizing agents are preferably used in desensitized form as a paste, for example in a mixture such as mineral oils, the active substance content conventionally being from 40 wt. % to 70 wt. %.

Sulfur is a most particularly preferred vulcanizing agent (b).

In a fourth preferred embodiment, dinitrosobenzenes, in particular 1,4-dinitrosobenzene, are used as vulcanizing agents. This group of substances is preferably used in the preparations according to the invention in a concentration from 0.2 wt. % to 5 wt. %, relative in each case to the total heat-curable preparation.

Irrespective of the specific embodiment, it has proved particularly advantageous for the vulcanizing agent to be used in combination with
- organic cure accelerators, such as for example mercaptobenzothiazole, dithiocarbamates, sulfenamides, disulfides such as for example dibenzothiazole disulfide and/or thiuram disulfides, aldehyde-amine accelerators, guanidines, and/or
- metal oxides, such as zinc oxide for example.

In addition, typical rubber vulcanizing aids such as for example fatty acids (for example stearic acid) can be present in the formulation.

The content of organic cure accelerators can preferably vary between 0 and approximately 10 wt. %. The content of metal oxides is also preferably in the range between 0 and 10 wt. %.

As the third component that is essential to the invention the preparations according to the invention contain at least one inorganic filler.

The first group of inorganic fillers includes for example the various ground or precipitated chalks, calcium magnesium carbonates, calcium oxide, barytes and in particular siliceous fillers of the aluminum magnesium calcium silicate type, for example wollastonite or chlorite, or aluminum borosilicate glasses. Chalks are preferred inorganic fillers according to the invention; ground mineral chalks are most particularly preferred. Moreover, calcium oxide is a particularly preferred inorganic filler within the meaning of the present invention. The content of calcium carbonate and/or calcium oxide can preferably vary between 5 wt. % and approximately 50 wt. %, relative to the total heat-curing preparation. In the case of calcium oxide concentrations of between 0 and approximately 10 wt. % are customary, relative to the total heat-curing preparation.

In some circumstances it can be convenient for at least some of the inorganic fillers to be surface-pretreated; in particular, a coating with at least one fatty acid, in particular with stearic acid, has proved convenient for the various calcium carbonates and chalks.

A second group of inorganic fillers which can be used in the heat-curing preparations according to the invention are the platelet-like fillers. Heat-curing preparations containing at least one platelet-like filler, such as for example graphite, vermiculite, mica, talc or similar phyllosilicates, are particularly preferred. Graphite is a particularly preferred platelet-like filler within the meaning of the present invention. Platelet-like fillers are preferably used if a positive influence on the acoustic properties is desired. The content of platelet-like fillers can preferably be between 5 wt. % and up to 30 wt. %.

A third group of preferred inorganic fillers according to the invention are rheology additives, which can have an influence on the rheology and/or strength of the preparations. According to the invention the rheology additives are preferably selected from silicon dioxide and/or carbon black.

According to the invention the term "silicon dioxide" also encompasses the oxide forms of silicon known as silica.

It can be preferable according to the invention for the preparations to contain at least one surface-modified silicon dioxide; hydrophilically modified silicon dioxides have particularly advantageous properties as the surface-modified silicon dioxide.

Surface-modified silicon dioxide types having a specific surface area of at least 100 $m^2/g$, in particular at least 150 $m^2/g$ (measured in each case by the BET method) are particularly preferred according to the invention.

According to the invention carbon black is understood to be preferably industrially manufactured carbon black.

A content of 0 to 5 wt. %, in particular 0.1 to 4 wt. %, most particularly 0.5 to 3 wt. % of a rheology additive, preferably selected from silicon dioxide and/or carbon black, relative to the total heat-curable preparation, is particularly preferred.

It is preferable according to the invention for the heat-curing preparations to contain a combination of two or more inorganic fillers. In particular, a combination of
- at least one inorganic filler selected from calcium carbonate and/or calcium oxide, and
- at least one platelet-like inorganic filler and/or at least one rheology additive is particularly preferred according to the invention.

A combination of
- at least one inorganic filler selected from calcium carbonate and/or calcium oxide,
- at least one platelet-like inorganic filler, and
- at least one rheology additive is most particularly preferred according to the invention.

It has proved particularly advantageous according to the invention for the heat-curing preparations to contain graphite, chalk and hydrophilically surface-modified silicon dioxide.

A most particularly preferred filler combination according to the invention is the combination of calcium oxide, calcium carbonate, graphite and hydrophilic silica.

The inorganic fillers are preferably used in an amount from 1 to 40 wt. %, in particular from 10 to 35 wt. %, relative in each case to the mass of the total heat-curable preparation.

In addition to the preferred "normal" inorganic fillers, the preparations according to the invention can also contain lightweight fillers. According to the invention a lightweight filler is understood to be a filler having a lower density than the rest of the preparation. Through the addition of such lightweight fillers the total density of the preparation is correspondingly reduced. Lightweight fillers are preferably selected from the group of hollow glass beads, fly ash (fillite), hollow plastic beads, based for example on phenolic resins, epoxy resins or polyesters, hollow ceramic beads or organic lightweight fillers of natural origin, such as ground nut shells, for example the shells of cashew nuts, coconuts or groundnut shells, as well as ground cork or coke powder. Lightweight fillers based on hollow microbeads are particularly preferred; these can be the aforementioned hollow glass beads but also the expandable or expanded hollow plastic microbeads based on polyvinylidene copolymers or acrylonitrile copolymers, the latter being commercially available under the names "Dualite" and "Expancel" from Pierce & Stevens and Akzo Nobel respectively.

It can be particularly preferable according to the invention for the heat-curable preparations to contain at least two different lightweight fillers. A combination of hollow glass beads and hollow plastic beads has proved particularly advantageous according to the invention, since preparations according to the invention containing this combination have improved compressive behavior under processing pressures.

Lightweight fillers are preferably contained in the heat-curable preparations in an amount from 0.1 to 15 wt. %, in particular from 0.4 to 7 wt. %, relative to the total heat-curable preparation.

The total proportion of fillers in the heat-curing formulation can vary between 10 and 70 wt. %, the preferred range being between 25 and 60 wt. %.

In addition to the various inorganic fillers and the lightweight fillers the heat-curable preparations according to the invention can moreover contain fibers. Preferred fibers according to the invention are selected from carbon fibers, aramid fibers, glass fibers, silicon nitride fibers, metal fibers, ceramic fibers, boron fibers, basalt fibers, polyethylene fibers, polypropylene fibers, polyester fibers and/or natural fibers, with flax and sisal fibers being particularly preferred as natural fibers.

The fibers are preferably contained in the heat-curing preparations in an amount from 0 to 6 wt. %, in particular from 0.5 to 5 wt. %, relative in each case to the total preparation.

It has moreover proved advantageous for the heat-curable preparations to contain, in addition to the unsaturated triglyceride fraction, at least one synthetic polymer having at least one C=C double bond and/or at least one C≡C triple bond. These polymers are preferably selected from the following group of homopolymers and/or copolymers:

polybutadienes, in particular 1,4- and 1,2-polybutadienes, polybutenes,
polyisobutylenes,
1,4-polyisoprenes,
styrene-butadiene copolymers and
butadiene acrylonitrile copolymers, wherein said polymers can have terminal and/or (randomly distributed) lateral functional groups. Examples of such functional groups are hydroxyl, carboxyl, carboxylic anhydride or epoxy groups.

Based on the average molecular weight (number average) of these synthetic, unsaturated polymers, a distinction is generally made between two types: liquid rubbers and solid rubbers. The average molecular weight of liquid rubbers is typically below 25,000 g/mol, preferably between 900 and 10,000 g/mol. The proportion of synthetic unsaturated polymers normally varies between 0 and 15 wt. %, in particular between 0 and 10 wt. % of the total formulation.

Suitable solid rubbers conventionally have a significantly higher molecular weight than the liquid rubbers (100,000 g/mol or higher). Examples of suitable solid rubbers are polybutadiene, preferably having a very high proportion of 1,4-cis double bonds (typically above 95 wt. %), styrene butadiene rubber, butadiene acrylonitrile rubber, synthetic or natural isoprene rubber, butyl rubber or polyurethane rubber.

In a further embodiment it is preferable for the heat-curable compositions according to the invention moreover to contain at least one antioxidant.

Although the conventional synthetic antioxidants, such as for example sterically hindered phenols or amine derivatives, are suitable in principle according to the invention, it has proved particularly advantageous within the meaning of the invention for a natural antioxidant to be used.

Examples of preferred synthetic antioxidants according to the invention are the products which are commercially available under the trade name Wingstay® as well as 2,2-methylene bis(4-methyl-6-tert-butylphenol) and 2,6-di-tert-butyl-p-cresol (3,5-di-tert-butyl-4-hydroxytoluene).

According to the invention a natural antioxidant is understood to be a compound which can be obtained from naturally sustainable raw materials. It is particularly preferable to use compounds which are obtained directly, i.e. without chemical modification, from natural raw materials as natural antioxidants. Examples of this group of substances which are preferred according to the invention are tocopherol, squalene and sesamolin. Tocopherol is most particularly preferred according to the invention.

The antioxidants, in particular the natural antioxidants, are preferably used in the heat-curing preparations according to the invention in amounts from 0.1 to 5 wt. %, in particular from 0.2 to 3 wt. %, relative in each case to the total heat-curing preparation.

The heat-curing preparations according to the invention can moreover contain typical constituents for this type of preparation.

Thus, for example, hydrocarbon resins, phenolic resins, terpene-phenolic resins, resorcinol resins or derivatives thereof, modified or unmodified rosin acids or esters (abietic acid derivatives), polyamines, polyaminoamides, polyepoxy resins and copolymers containing anhydrides and anhydride groups can be used as tackifiers and/or adhesion promoters. The type and amount of tackifiers or adhesion promoters is dependent on the polymer composition of the adhesive, sealant and coating composition, on the strength of the cured composition and on the substrate to which the composition is applied. Typical tackifying resins (tackifiers) such as for example the terpene-phenolic resins or rosin acid derivatives are normally used in concentrations of between 5 and 20 wt. %; typical adhesion promoters such as polyamines, polyaminoamides or resorcinol derivatives are used in the range between 0.1 and 10 wt. %.

The compositions according to the invention are preferably free from plasticizers, in particular phthalic acid esters or extender oils. However, it can be necessary to influence the rheology of the uncured composition and/or the mechanical properties and/or the acoustic damping of the cured compositions by adding extender oils, in other words aliphatic, aromatic or naphthenic oils or citric acid esters. However, this is preferably done by adding low-molecular-weight polybutenes, polyisobutylenes or by using low-molecular-weight liquid rubbers. If extender oils are used, amounts in the range between 5 and 20 wt. %, relative to the total heat-curing preparation, are used.

If the heat-curable preparations according to the invention are to be used as acoustic materials, it has proved preferable according to the invention for these to have a viscosity at 20° C. of 1000 mPa·s to 100,000 mPa·s, measured in accordance with DIN 53019, prior to curing. Particular preferred ranges for the viscosity of heat-curing preparations for use in the acoustic sector are:

at 20° C.: 15,000 mPa·s-80,000 mPa·s, and
at 40° C.: 5000 mPa·s-20,000 mPa·s.

If the heat-curable compositions according to the invention are to be used as adhesives and sealants or as lining adhesives, it has proved preferable according to the inven tion for them to have the following viscosities, measured in accordance with DIN 53019, prior to curing:

at 20° C.: 150,000 mPa·s-400,000 mPa·s, and
at 40° C.: 100,000 mPa·s-200,000 mPa·s.

The heat-curable preparations according to the invention can be produced by mixing the selected components in any suitable mixer, such as for example a dispersing mixer, a planetary mixer, a twin-screw mixer, a continuous mixer or an extruder, in particular a twin-screw extruder.

If the heat-curing preparations according to the invention also contain, in addition to the components that are essential to the invention, at least one solid rubber, it is advantageous for production of the components to take place in a suitable extruder, for example a twin-screw extruder, or a suitable compounder under high shear.

Irrespective of the choice of tool, it can optionally be advantageous to allow a slight heating of the preparation or to heat the preparation slightly, to make it easier to achieve a homogeneous, uniform composition; care must be taken, however, to ensure that it does not reach temperatures that would activate the vulcanization reaction.

Accordingly, the present invention secondly provides the production of the heat-curing preparation according to the invention by mixing the components under high shear.

The preparations according to the invention are preferably stored until use in vessels with a capacity of 100 liters (containers), 200 liters (drums), 20 to 50 liters (hobbocks), rail tankers or day tanks (20,000 liters) for large-scale applications, and in cartridges from 310 to 500 ml for manual application in particular.

At the time of application the heat-curable preparation according to the invention is transported from the storage vessel to the place of application using conventional, optionally heated pumps and applied there. The preparations according to the invention are characterized by being able to be applied by spray methods. In particular, applying the preparations to the substrate by means of airless, air-assisted or Airmix spraying methods or flat-stream methods is particularly preferred according to the invention. Applying the preparations according to the invention by means of a flat-stream method is most particularly preferred according to the invention.

Atomizing or non-atomizing spraying methods can be used for an application by the preferred high-pressure spraying method. Atomization of the preparation material for application is possible under the material pressure alone with the airless method or with additional air support in the air-assisted or Airmix spraying method. Non-atomizing application methods such as the flat-stream method or electro-swirl method are particularly preferably used according to the invention for application of the preparation. With both of these methods the final coating thickness of the preparation can be applied to the substrate in just one application movement at high application rates of >100 mm/s in coating thicknesses of up to 5 mm.

An application of the preparations according to the invention with one of the two aforementioned non-atomizing application methods, flat-stream and electro-swirl, is characterized by a sharp-edged material application on the substrate with no overspray, in other words without contaminating the substrate adjacent to the application site with spray mist, by low spraying pressures in the range from 60 to 120 bar, and by a very high repeatability in the case of multiple series applications.

Heat is used to cure the applied heat-curing preparation, by heating the preparation for a certain time to a temperature which is sufficient to bring about the vulcanization reaction.

It is preferable according to the invention for the vulcanization reaction to be completed within this heating time; however, methods with short oven cycle times and post-curing in a downstream oven and in individual cases even post-curing after the time in the oven are also possible.

Depending on the composition of the preparation and the production line conditions, such temperatures are conventionally in the range from 150° C. to 230° C. for body shell lines, preferably from 160° C. to 185° C., with a residence time of 10 to 90 minutes, preferably 15 to 30 minutes. For paint lines the temperatures are 120° C. to 175° C., preferably 130° C. to 160° C., with a residence time of 5 to 60 minutes, preferably 10 to 30 minutes.

The nature of the heat source is unimportant in principle, so the heat can be supplied by a hot air fan, by irradiation with microwaves or infrared radiation, by magnetic induction or by heating tongs, for example. In the automotive construction sector and in technology fields with related manufacturing processes it is particularly advantageous for curing of the preparations according to the invention to take place as the vehicle passes through the oven to cure the cathodic dip coating or to stove the paint coatings, so as to avoid a separate heating step.

The invention thirdly provides the use of the preparations according to the invention as an acoustically damping one- or two-component adhesive, sealant or coating composition.

The preparations according to the invention are frequently used for lining sheet metal constructions in which a torsion-resistant support plate is adhesively bonded to a thin-walled outer skin. Owing to the elastic behavior under static loading in the cold state, the preparations according to the invention have the advantage of binding without leaving a mark.

All that has been stated in respect of the earlier subject matter of the present invention applies with necessary alterations to the further details of this subject matter.

The present invention fourthly provides a method for binding metal parts and/or for sealing joins between metal parts, wherein a preparation according to the invention is applied to at least one surface of at least one of the parts,
the parts to be joined are joined together,
and the joined parts are heated, optionally while being mechanically fixed in position, to cure the preparation.

All that has been stated in respect of the earlier subject matter of the present invention applies with necessary alterations to the further details of this subject matter.

The present invention fifthly provides a method for coating components by spraying a preparation according to the invention onto the surface of the part and heating the coated part to cure the preparation.

Likewise included according to the invention is a method for the acoustic damping of components, wherein at least one surface of the component is coated with a preparation according to the invention and the coated component is heated to cure the preparation.

It is preferable according to the invention for the coating of the component to be carried out by spraying the preparation according to the invention.

The acoustic properties of the component are improved by the application of the preparation according to the invention.

In the context of this subject matter of the present invention it has proved particularly advantageous for the preparation according to the invention to be sprayed onto the substrate by means of an airless, air-assisted or Airmix spraying method, by a flat-stream method or by a swirl method.

All that has been stated in respect of the earlier subject matter of the present invention likewise applies with necessary alterations to the further details of this subject matter.

EMBODIMENT EXAMPLES

Unless otherwise specified, all stated quantities are percentages by weight.

1 Acoustically Effective Adhesives 1.1 Formulations

The following preparations were produced:

| Example 1 | |
| --- | --- |
| Calcium oxide | 2.00 |
| 2,2-Methylene bis(4-methyl-6-tert-butylphenol) | 0.50 |
| Calcium carbonate | 19.29 |
| Calcium carbonate (coated with stearate) | 14.75 |
| Sulfur, powdered | 11.00 |
| Lithene ® ALS | 4.00 |
| Polyvest MA 75 ® | 1.00 |
| Graphite | 15.00 |
| Scotchlite ® Glass Bubbles type VS 5500 | 7.00 |
| Linseed oil | 23.00 |
| Zinc dibenzyl dithiocarbamate | 0.80 |
| Zinc 2-mercaptobenzothiazole | 0.90 |
| Hydrophilic silica | 0.70 |
| Expancel ® 091 DU 140 | 0.05 |
| Odor-bearing additive | 0.01 |

| Example 2 | |
| --- | --- |
| Calcium oxide | 2.00 |
| 2,2-Methylene bis(4-methyl-6-tert-butylphenol) | 0.50 |
| Calcium carbonate | 19.49 |
| Calcium carbonate (coated with stearate) | 14.88 |
| Sulfur, powdered | 10.00 |
| Kuraray ® LIR 30 | 3.00 |
| Polyvest MA 75 ® | 1.00 |
| Graphite | 15.0 |
| Scotchlite ® Glass Bubbles type VS 5500 | 7.00 |
| Linseed oil | 24.00 |
| Zinc dibenzyl dithiocarbamate | 0.80 |
| Zinc 2-mercaptobenzothiazole | 0.90 |
| Hydrophilic silica | 1.37 |
| Expancel ® 091 DU 140 | 0.05 |
| Odor-bearing additive | 0.01 |

| Example 3 | |
| --- | --- |
| Calcium oxide | 2.00 |
| 2,2-Methylene bis(4-methyl-6-tert-butylphenol) | 0.50 |
| Calcium carbonate | 11.49 |
| Calcium carbonate (coated with stearate) | 14.75 |
| Sulfur, powdered | 12.00 |
| Polyvest MA 75 ® with active carboxyl groups, Mn 1700 g/mol | 1.00 |
| Graphite | 15.00 |
| Scotchlite ® Glass Bubbles type VS 5500 | 7.00 |
| Linseed oil | 33.00 |
| Zinc dibenzyl dithiocarbamate | 0.80 |
| Zinc 2-mercaptobenzothiazole | 0.90 |
| Hydrophilic silica | 0.70 |
| Expancel ® 091 DU 140 | 0.05 |
| Aluminum borosilicate glass | 0.80 |
| Odor-bearing additive | 0.01 |

| Example 4 | |
| --- | --- |
| Calcium oxide | 2.00 |
| Tocopherol | 0.50 |
| Calcium carbonate | 20.79 |
| Calcium carbonate (coated with stearate) | 14.75 |
| Sulfur, powdered | 9.00 |
| Lithene ® ALS | 4.00 |
| Polyvest MA 75 ® | 1.00 |
| Graphite | 15.00 |
| Scotchlite ® Glass Bubbles type VS 5500 | 7.00 |
| Linseed oil | 23.00 |
| Zinc dibenzyl dithiocarbamate | 0.80 |
| Zinc 2-mercaptobenzothiazole | 0.90 |
| Hydrophilic silica | 1.20 |
| Expancel ® 091 DU 140 | 0.05 |
| Neutralizing additive | 0.01 |

| Example 5 | |
| --- | --- |
| Calcium oxide | 2.00 |
| Tocopherol | 0.50 |
| Calcium carbonate | 14.19 |
| Calcium carbonate (coated with stearate) | 14.75 |
| Sulfur, powdered | 10.00 |
| Kuraray ® LIR 30 | 5.00 |
| Polyvest MA 75 ® | 2.00 |
| Graphite | 15.00 |
| Scotchlite ® Glass Bubbles type VS 5500 | 7.00 |
| Linseed oil | 26.30 |
| Zinc dibenzyl dithiocarbamate | 0.80 |
| Zinc 2-mercaptobenzothiazole | 0.90 |
| Hydrophilic silica | 1.50 |
| Expancel ® 091 DU 140 | 0.05 |
| Neutralizing additive | 0.01 |

| Example 6 (comparison) | |
| --- | --- |
| Calcium oxide | 2.0 |
| 2,2-Methylene bis(4-methyl-6-tert-butylphenol) | 0.5 |
| Calcium carbonate | 12.0 |
| Calcium carbonate (coated with stearate) | 14.6 |
| Sulfur, powdered | 12.0 |
| Graphite | 15.0 |
| Scotchlite ® Glass Bubbles type VS 5500 | 6.0 |
| Linseed oil | 35.0 |
| Zinc dibenzyl dithiocarbamate | 0.8 |
| Zinc 2-mercaptobenzothiazole | 0.9 |
| Hydrophilic silica | 1.14 |
| Expancel ® 091 DU 140 | 0.05 |
| Odor-bearing additive | 0.01 |

| Example 7 | |
| --- | --- |
| Calcium oxide | 2.00 |
| 2,2-Methylene bis(4-methyl-6-tert-butylphenol) | 0.50 |
| Calcium carbonate | 19.29 |
| Calcium carbonate (coated with stearate) | 14.75 |
| Sulfur, powdered | 11.00 |
| Nisso ® PB B-2000 | 4.00 |
| Polyvest MA 75 ® | 1.00 |
| Graphite | 15.00 |
| Scotchlite ® Glass Bubbles type VS 5500 | 7.00 |
| Linseed oil | 23.00 |
| Zinc dibenzyl dithiocarbamate | 0.80 |
| Zinc 2-mercaptobenzothiazole | 0.90 |
| Hydrophilic silica | 0.70 |
| Expancel ® 091 DU 140 | 0.05 |
| Odor-bearing additive | 0.01 |

Example 8

| | |
|---|---|
| Calcium oxide | 2.00 |
| 2,2-Methylene bis(4-methyl-6-tert-butylphenol) | 0.50 |
| Calcium carbonate | 19.24 |
| Calcium carbonate (coated with stearate) | 14.00 |
| Sulfur, powdered | 11.00 |
| Nisso ® PB B-1000 | 5.00 |
| Polyvest MA 75 ® | 2.00 |
| Graphite | 15.00 |
| Scotchlite ® Glass Bubbles type VS 5500 | 7.00 |
| Linseed oil | 21.00 |
| Zinc dibenzyl dithiocarbamate | 0.80 |
| Zinc 2-mercaptobenzothiazole | 0.90 |
| Hydrophilic silica | 1.50 |
| Expancel ® 091 DU 140 | 0.05 |
| Odor-bearing additive | 0.01 |

Example 9

| | |
|---|---|
| Calcium oxide | 2.00 |
| 2,2-Methylene bis(4-methyl-6-tert-butylphenol) | 0.50 |
| Calcium carbonate | 17.24 |
| Calcium carbonate (coated with stearate) | 14.00 |
| Sulfur, powdered | 13.00 |
| Polyvest ® 110 | 5.00 |
| Polyvest MA 75 ® | 2.00 |
| Graphite | 15.00 |
| Scotchlite ® Glass Bubbles type VS 5500 | 7.00 |
| Linseed oil | 21.00 |
| Zinc dibenzyl dithiocarbamate | 0.80 |
| Zinc 2-mercaptobenzothiazole | 0.90 |
| Hydrophilic silica | 1.50 |
| Expancel ® 091 DU 140 | 0.05 |
| Odor-bearing additive | 0.01 |

Example 10

| | |
|---|---|
| Calcium oxide | 2.00 |
| 2,2-Methylene bis(4-methyl-6-tert-butylphenol) | 0.50 |
| Calcium carbonate | 15.24 |
| Calcium carbonate (coated with stearate) | 14.00 |
| Sulfur, powdered | 13.00 |
| Polyvest ® 130 | 5.00 |
| Poly BD R 45 HT ® | 4.00 |
| Graphite | 15.00 |
| Scotchlite ® Glass Bubbles type VS 5500 | 7.00 |
| Linseed oil | 21.00 |
| Zinc dibenzyl dithiocarbamate | 0.80 |
| Zinc 2-mercaptobenzothiazole | 0.90 |
| Hydrophilic silica | 1.50 |
| Expancel ® 091 DU 140 | 0.05 |
| Odor-bearing additive | 0.01 |

Example 11

| | |
|---|---|
| Calcium oxide | 2.00 |
| 2,2-Methylene bis(4-methyl-6-tert-butylphenol) | 0.50 |
| Calcium carbonate | 22.69 |
| Calcium carbonate (coated with stearate) | 14.75 |
| Sulfur, powdered | 14.20 |
| Lithene ® ALS | 4.00 |
| Polyvest MA 75 ® | 1.00 |
| Graphite | 15.00 |
| Expancel ® 920 DE 80 d30 | 0.40 |
| Linseed oil | 23.00 |
| Zinc dibenzyl dithiocarbamate | 0.80 |
| Zinc 2-mercaptobenzothiazole | 0.90 |
| Hydrophilic silica | 0.70 |
| Expancel ® 091 DU 140 | 0.05 |
| Odor-bearing additive | 0.01 |

Example 12

| | |
|---|---|
| Calcium oxide | 2.00 |
| 2,2-Methylene bis(4-methyl-6-tert-butylphenol) | 0.50 |
| Calcium carbonate | 18.89 |
| Calcium carbonate (coated with stearate) | 14.75 |
| Sulfur, powdered | 14.20 |
| Lithene ® ALS | 4.00 |
| Polyvest MA 75 ® | 1.00 |
| Graphite | 15.00 |
| Scotchlite ® Glass Bubbles type VS 5500 | 4.00 |
| Expancel ® 920 DE 80 d30 | 0.20 |
| Linseed oil | 23.00 |
| Zinc dibenzyl dithiocarbamate | 0.80 |
| Zinc 2-mercaptobenzothiazole | 0.90 |
| Hydrophilic silica | 0.70 |
| Expancel ® 091 DU 140 | 0.05 |
| Odor-bearing additive | 0.01 |

Example 13

| | |
|---|---|
| Calcium oxide | 2.00 |
| 2,2-Methylene bis(4-methyl-6-tert-butylphenol) | 0.50 |
| Calcium carbonate | 19.29 |
| Calcium carbonate (coated with stearate) | 14.75 |
| Sulfur, powdered | 11.00 |
| Lithene ® ALS | 4.00 |
| Polyvest MA 75 ® | 1.00 |
| Graphite | 15.00 |
| Scotchlite ® Glass Bubbles type VS 5500 | 7.00 |
| Hemp oil | 23.00 |
| Zinc dibenzyl dithiocarbamate | 0.80 |
| Zinc 2-mercaptobenzothiazole | 0.90 |
| Hydrophilic silica | 0.70 |
| Expancel ® 091 DU 140 | 0.05 |
| Odor-bearing additive | 0.01 |

Example 14

| | |
|---|---|
| Calcium oxide | 2.00 |
| 2,2-Methylene bis(4-methyl-6-tert-butylphenol) | 0.50 |
| Calcium carbonate | 19.29 |
| Calcium carbonate (coated with stearate) | 14.75 |
| Sulfur, powdered | 11.00 |
| Lithene ® ALS | 4.00 |
| Polyvest MA 75 ® | 1.00 |
| Graphite | 15.00 |
| Scotchlite ® Glass Bubbles type VS 5500 | 7.00 |
| Cod liver oil | 23.00 |
| Zinc dibenzyl dithiocarbamate | 0.80 |
| Zinc 2-mercaptobenzothiazole | 0.90 |
| Hydrophilic silica | 0.70 |
| Expancel ® 091 DU 140 | 0.05 |
| Odor-bearing additive | 0.01 |

1.2 Manufacturing Instructions

In order to produce the preparations, the resins were each placed in an unheated planetary mixer and homogenized for at least 20 min under a vacuum of less than 100 mbar at a mixing rate of 100 rpm. Then the fillers were gradually added and the resulting mixtures were each mixed at a maximum rate of 50 rpm until homogeneous compositions were obtained. Then the mixtures were homogenized for a further 20 min under a vacuum of less than 100 mbar at a mixing rate of 100 rpm. The remaining raw materials were then added to the formulations and mixed at a maximum rate of 50 rpm until homogeneous compositions were obtained. Lastly the mixtures were homogenized for a further 10 min under a vacuum of less than 100 mbar at a mixing rate of 100 rpm and introduced into cartridges. Throughout the mixing and homogenizing processes, care was taken to ensure that the heat of mixing did not cause the preparation temperature to rise above 60° C.

1.3 List of Commercial Products Used:

| | |
|---|---|
| Expancel ® 091 DU 140 | Expandable hollow microbeads made from acrylonitrile-methacrylonitrile-methyl methacrylate copolymer, particle size approx. 35-45 μm; Akzo Nobel; |
| Expancel ® 920 DE 80 d30 | Expanded hollow microbeads made from acrylonitrile-methacrylonitrile-methyl methacrylate copolymer, containing isopentane; Akzo Nobel; |
| Kuraray ® LIR 30 | Liquid polyisoprene, Mn approx. 29,000 g/mol, Nippon Soda; |
| Lithene ® ALS | Liquid polybutadiene, Mn approx. 1000 g/mol, approx. 10-20 wt. % cis-1,4 proportion, Synthomer; |
| Nisso ® PB B-1000 | Liquid 1,2-polybutadiene, Mn approx. 1000 g/mol, approx. 85 wt. % 1,2-vinyl proportion, Nippon Soda; |
| Nisso ® PB B-2000 | Liquid 1,2-polybutadiene, Mn approx. 2000 g/mol, approx. 90 wt. % 1,2-vinyl proportion, Nippon Soda; |
| Poly BD R 45 HAT ® | Hydroxyl-terminated 1,3-polybutadiene; Mn approx. 2800 g/mol, Sartomer/Cray Valley; |
| Polyvest ® 110 | Oligomeric, liquid 1,3-polybutadiene; Mn approx. 2600 g/mol; approx. 75 wt. % cis-1,4 proportion, Evonik; |
| Polyvest ® 130 | Oligomeric, liquid 1,3-polybutadiene; Mn approx. 4600 g/mol; approx. 75 wt. % cis-1,4 proportion, Evonik; |
| Polyvest ® MA 75 | Polybutadiene with active carboxyl groups, Mn 1700 g/mol; Evonik; |
| Scotchlite ® Glass Bubbles type VS 5500 | Hollow glass beads made from soda-lime borosilicate glass, 3M. |

1.4 Measuring Results:

1.4.1 Determining the Shore a Hardness

To determine the Shore A hardness the example formulations were each cured for 20 minutes at 160° C. Then samples were taken with a material thickness of 5 mm and the Shore A hardness was determined at room temperature. The measured values are summarized in Table 1.

1.4.2 Determining the Shear Strength

The preparations according to the invention were applied to steel sheets (cathodic electrodeposition coated substrate; specimen thickness: 0.8 mm; width 25 mm). The cathodic electrodeposition coated sheets treated with the preparations according to the invention were brought into contact in such a way that an overlapping region of 20 mm was formed. The specimens were pressed to the thickness of the gap to be bonded (using steel balls with a diameter of 2000 μm as spacers), secured with clamps and then cured for 20 min at 160° C. The measurement was carried out on the following day at 25° C. and at a shear rate of 25 mm/min. In all cases a more than 75% cohesive fracture behavior was observed for the preparations according to the invention. The measured values are summarized in Table 1.

1.4.3 Determining the Loss Factor and the Loss Maximum

Spring steel strips measuring 240 mm×10 mm with a thickness of 1 mm were coated with a layer of the products from examples 1-14 over a 200 mm long section, then the coatings were cured for 20 min at an object temperature of 160° C. After cooling, the damping value was determined using the torsion pendulum test specified in DIN 53440, part 3, at 200 Hz in a temperature range from −25° C. to +80° C. The breadth of the temperature range within which the loss factor is greater than 0.1 is indicated in each case. The loss maximum indicates the temperature at which the loss factor assumes its maximum value. The measured values are summarized in Table 1.

TABLE 1

| | Shore hardness [scale divisions] | Shear strength [MPa] | Loss factor [K] | Loss maximum [° C.] |
|---|---|---|---|---|
| Example 1 | 70.2 | 0.87 | 30.1 | 20 |
| Example 2 | 82.3 | 1.17 | 26.5 | 10 |
| Example 3 | 71.4 | 1.02 | 27.4 | 0 |
| Example 4 | 72.5 | 0.91 | 29.3 | 20 |
| Example 5 | 83.7 | 1.12 | 26.9 | 10 |
| Example 6 (comparison) | 70.5 | 0.89 | 26.5 | −10 |
| Example 7 | 92.6 | 2.19 | 31.3 | 20 |
| Example 8 | 82.8 | 1.18 | 30.4 | 20 |
| Example 9 | 77.5 | 0.94 | 28.0 | 10 |
| Example 10 | 75.8 | 0.88 | 29.1 | 10 |
| Example 11 | 72.3 | 0.81 | 31.2 | 20 |
| Example 12 | 73.1 | 0.79 | 29.8 | 20 |
| Example 13 | 89.2 | 2.11 | 32.2 | 10 |
| Example 14 | 91.2 | 2.05 | 31.7 | 10 |

2 Lining Adhesives 2.1 Formulations

The following preparations were produced:

| Example U1 | |
|---|---|
| Solid polybutadiene rubber with min. 96 wt. % 1,4-cis proportion; Mn approx. 500,000 to 1,000,000 g/mol | 6.00 |
| Carbon black | 0.50 |
| Calcium oxide, ground | 3.00 |
| Zinc oxide | 2.00 |
| Calcium carbonate | 30.65 |
| Magnesium hydrosilicate | 10.00 |
| p-Benzoquinone dioxime | 1.00 |
| Calcium carbonate, surface-treated with fatty acids | 13.20 |
| 2,2-Dithiobis(benzothiazole) | 4.00 |
| Polyvest ® MA 75 | 7.00 |
| Linseed oil | 15.00 |
| Zinc 2-mercaptobenzothiazole | 1.00 |
| Rapeseed oil | 4.00 |
| Sulfur, powdered | 2.50 |
| Expancel ® 091 DU 140 | 0.15 |

| Example U2 | |
|---|---|
| Solid polybutadiene rubber with min. 96 wt. % 1,4-cis proportion; Mn approx. 500,000 to 1,000,000 g/mol | 4.50 |
| Carbon black | 0.50 |
| Calcium oxide, ground | 2.50 |
| Zinc oxide | 4.00 |
| Calcium carbonate | 8.895 |
| 2,2-Methylene bis(4-methyl-6-tert-butylphenol) | 0.50 |
| Calcium carbonate (precipitated); surface-treated with fatty acids | 31.00 |
| 2,2-Dithiobis(benzothiazole) | 1.00 |
| Benzenesulfinic acid, zinc salt | 0.005 |
| Azodicarboxylic acid amide | 0.05 |
| Paraffinic mineral oil | 9.00 |
| Rapeseed oil | 15.00 |
| Linseed oil | 10.00 |
| Polyvest ® MA 75 | 4.90 |
| 1,2-Polybutadiene, maleic anhydride adduct; Mn 1600 g/mol | 1.95 |
| Expancel ® 091 DU 140 | 0.20 |
| Sulfur, powdered | 6.00 |

The preparation was made according to the manufacturing instructions in section 1.2; the commercial products used have the meanings indicated in section 1.3.

2.2 Measuring Results:

2.2.1 Determining the Shore A Hardness

To determine the Shore A hardness, example formulations U2 and U2 were each cured for 20 minutes at 160° C. Then samples were taken with a material thickness of 5 mm and the Shore A hardness was determined at room temperature. The measured values are summarized in Table 2.

2.2.2 Determining the Shear Strength

The preparations according to the invention were applied to steel sheets (grade 14 O 5; specimen thickness: 0.8 mm; width 25 mm) treated with anti-corrosive oil (Anticorit® RP 4107S; Fuchs). The sheets treated with the preparations according to the invention were brought into contact in such a way that an overlapping region of 20 mm was formed. The specimens were pressed to the thickness of the gap to be bonded (using steel balls with a diameter of 2000 μm as spacers), secured with clamps and then cured for 20 min at 160° C. The measurement was carried out on the following day at 25° C. and at a shear rate of 25 mm/min. In all cases a more than 75% cohesive fracture behavior was observed in the preparations according to the invention. The measured values are summarized in Table 2.

TABLE 2

|  | Shore A hardness [scale divisions] | Tensile strength [MPa] |
| --- | --- | --- |
| Example U1 | 64.0 | 1.79 |
| Example U2 | 45.3 | 1.23 |

What is claimed is:

1. A hot-curing preparation containing
   (a) a triglyceride fraction, the fatty acid distribution of which has a proportion of at least 5 wt. % of one or more Ω-3 fatty acids and/or one or more Ω-6 fatty acids,
   (b) at least one vulcanizing agent selected from the group consisting of
      (b1) sulfur,
      (b2) peroxidic vulcanizing agents,
      (b3) quinones and/or quinone dioximes and/or
      (b4) dinitrosobenzenes,
   (c) at least one inorganic filler, and
   (d) at least one synthetic polymer having at least one C=C double bond and/or at least one C≡C triple bond;
   wherein the triglyceride fraction has a fatty acid distribution having a proportion of at least 15 wt. % of one or more Ω-3 fatty acids.

2. The preparation according to claim 1, characterized in that α-linolenic acid is included as the 5-3 fatty acid.

3. The preparation according to claim 1, characterized in that the triglyceride fraction contains linseed oil.

4. The preparation according to claim 1, characterized in that (c) contains calcium carbonate as the inorganic filler.

5. The preparation according to claim 1, characterized in that in addition to the vulcanizing agent at least one organic curing accelerator and/or at least one metal oxide is included.

6. The preparation according to claim 1, characterized in that it contains at least one rheology additive as the inorganic filler.

7. The preparation according to claim 1, characterized in that it further contains at least one antioxidant.

8. A method for joining metal parts and/or for sealing joins between metal parts, characterized in that
   a preparation according to claim 1 is applied to at least one surface of at least one of the parts,
   the parts to be joined are joined together,
   and the joined parts are heated, optionally while being mechanically fixed in position, to cure the preparation.

9. A method for coating components by spraying a preparation according to claim 1 onto the surface of the part and heating the coated part to cure the preparation.

10. The method for coating components according to claim 9, characterized in that the preparation is sprayed onto the substrate in airless, air-assisted or Airmix spraying methods, flat-stream methods or swirl methods.

11. The preparation according to claim 1, wherein the fatty acid distribution of the triglyceride fraction, has a proportion of at least 60 wt. % of one or more Ω-3 fatty acids and/or one or more Ω-6 fatty acids.

12. The preparation according to claim 1, further comprising at least one natural antioxidant.

13. The preparation according to claim 1, wherein (c) comprises at least one rheology additive selected from silicon dioxide, carbon black and combinations thereof.

14. The preparation according to claim 1, wherein the triglyceride fraction (a) is present in an amount from 5 to 50 wt. %, relative to the total preparation.

* * * * *

UNITED STATES PATENT AND TRADEMARK OFFICE
CERTIFICATE OF CORRECTION

PATENT NO. : 9,493,687 B2  Page 1 of 1
APPLICATION NO. : 14/568962
DATED : November 15, 2016
INVENTOR(S) : Ralf Sauer et al.

It is certified that error appears in the above-identified patent and that said Letters Patent is hereby corrected as shown below:

In the Specification

Column 10, Line 38: Change "sealing joins" to -- sealing joints --.

Column 15, Line 35: Change "Shore a" to -- Shore A --.

Column 17, Line 7: Change "U2 and U2" to -- U1 and U2 --.

In the Claims

Column 18, Line 8: Change "5-3" to -- Ω-3 --.

Column 18, Line 22: Change "joins" to -- joints --.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*